United States Patent
Erdmann et al.

(10) Patent No.: US 10,912,311 B2
(45) Date of Patent: Feb. 9, 2021

(54) PROCESS FOR TREATING SWEET WHEY SUCH AS TO OBTAIN A PROTEIN MATERIAL SUITABLE FOR HYPOALLERGENIC INFANT FORMULAE

(71) Applicant: NESTEC S.A., Vevey (CH)

(72) Inventors: Peter Erdmann, Bern (CH); Gustavo Rocha, Freimettigen (CH); Gerard Terpstra, Cordast (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/547,612

(22) PCT Filed: Feb. 2, 2016

(86) PCT No.: PCT/EP2016/052156
§ 371 (c)(1),
(2) Date: Jul. 31, 2017

(87) PCT Pub. No.: WO2016/128251
PCT Pub. Date: Aug. 18, 2016

(65) Prior Publication Data
US 2018/0000103 A1    Jan. 4, 2018

(30) Foreign Application Priority Data
Feb. 9, 2015    (EP) ..................... 15154369

(51) Int. Cl.
*A23C 9/146*    (2006.01)
*A23L 33/00*    (2016.01)
(Continued)

(52) U.S. Cl.
CPC ............. *A23C 9/146* (2013.01); *A23C 21/00* (2013.01); *A23J 1/205* (2013.01); *A23J 3/08* (2013.01);
(Continued)

(58) Field of Classification Search
CPC ......... A23C 9/146; A23C 21/00; A23L 33/18; A23L 22/194; A23J 1/205; A23J 1/208
(Continued)

(56) References Cited

U.S. PATENT DOCUMENTS 5,916,621 A * 1/1999 Georgi et al.
6,787,158 B1   9/2004 Erdmann et al.

FOREIGN PATENT DOCUMENTS

EP    0488589 A1    6/1992
EP    1048226       11/2000
(Continued)

OTHER PUBLICATIONS

Russian Office Action for Appl No. 2017131466/10(055090) dated Aug. 26, 2019.

*Primary Examiner* — Helen F Heggestad
(74) *Attorney, Agent, or Firm* — K&L Gates LLP

(57) ABSTRACT

The invention concerns a process for the treatment of a sweet whey material containing cGMP (caseinoGlycoMacroPeptide), said process comprising the following steps: —Decationising the sweet whey material so as to obtain sweet whey material having a pH value of 1 to 4.5; —Treating said sweet whey in a fluidized bed reactor comprising a specific volume of an anionic resin, at a temperature between 10 and 18° C., wherein said sweet whey contacts said resin for a sufficient amount of time so that the resin absorbs between 52% and 58% of the cGMP present in the sweet whey; and—Recovering a protein material. Advantageously, the protein material is suitable for hypoallergenic infant formulae.

8 Claims, 1 Drawing Sheet

(51) Int. Cl.
 *A23L 33/19* (2016.01)
 *A23J 3/08* (2006.01)
 *A23C 21/00* (2006.01)
 *A23L 33/18* (2016.01)
 *A23J 1/20* (2006.01)

(52) U.S. Cl.
 CPC .............. *A23L 33/18* (2016.08); *A23L 33/19* (2016.08); *A23L 33/40* (2016.08); *A23V 2002/00* (2013.01)

(58) Field of Classification Search
 USPC ................................. 426/801, 271, 583, 648
 See application file for complete search history.

(56) References Cited

FOREIGN PATENT DOCUMENTS

| | | |
|---|---|---|
| RU | 2260284 C2 | 9/2005 |
| WO | 0141580 | 6/2001 |

\* cited by examiner

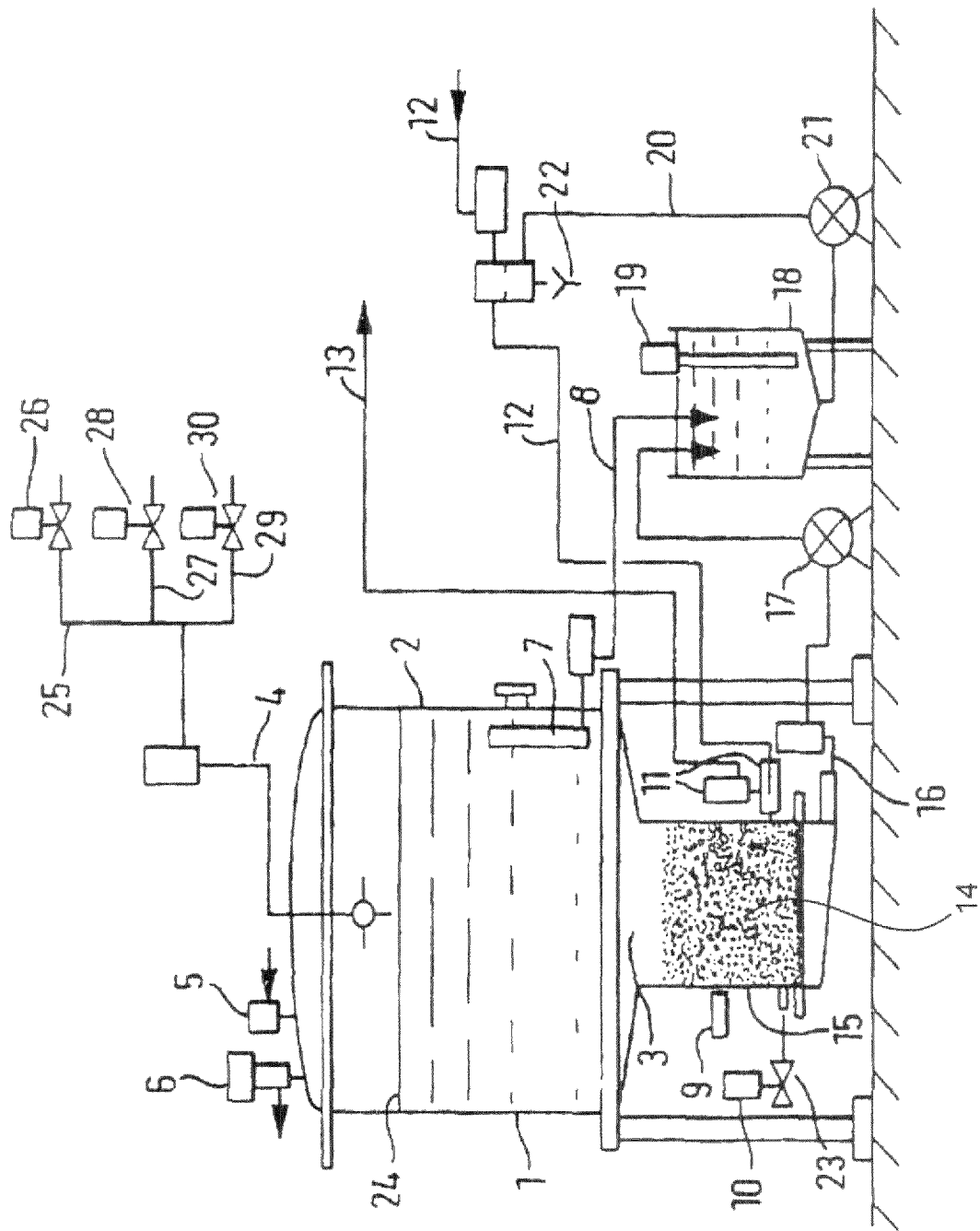

PROCESS FOR TREATING SWEET WHEY SUCH AS TO OBTAIN A PROTEIN MATERIAL SUITABLE FOR HYPOALLERGENIC INFANT FORMULAE

CROSS REFERENCE TO RELATED APPLICATIONS

The present application is a National Stage of International Application No. PCT/EP2016/052156, filed on Feb. 2, 2016, which claims priority to European Patent Application No. 15154369.1, filed on Feb. 9, 2015, the entire contents of which are being incorporated herein by reference.

TECHNICAL FIELD

The invention is directed to a process for the treatment of a sweet whey material containing cGMP (caseinoGlycoMacroPeptide), so that to obtain a protein material suitable for hypoallergenic infant formulae.

BACKGROUND OF THE INVENTION

Human Breast Milk and breast feeding represent the uncontested gold standard in terms of infant nutrition. Infant formulae that serve as a substitute for or complement to human breast milk should satisfy the nutritional requirements of infants, have an acceptable taste and be hypoallergenic when targeted to infants at risk of allergy. Infant formulae must comply with regulatory nutritional requirements, such as European Commission Directive 91/321/EEC of May 14, 1991 on infant formulae in Europe, and a similar corresponding regulatory document of the Food and Drug Administration (FDA) in the USA.

It is known that allergies to cows' milk and to infant formulae containing cow's milk protein are due to the fact that the proteins of cows' milk differ from the proteins of mother's milk and can constitute allergens for humans. Bovine whey protein and/or casein are often used as the milk protein source in infant formulae. To reduce allergenicity, cow's milk proteins are hydrolysed by enzymes and thus reduced to peptides. Current hypoallergenic formulae composed of such cow's milk proteins hydrolysates aimed at allergy prevention also comprise other nutrients such as animal oils, vegetable oils, starch, maltodextrin, lactose and sucrose. These protein hydrolysates may also be incorporated into an adult milk drink or food supplements.

The hydrolysis process used to produce these hydrolysates must be carefully monitored so that the final product hydrolysate retains its nutritional value and desired physical properties but is hypoallergenic. Hydrolysates may be characterized as "partial" or "extensive" depending on the degree to which the hydrolysis reaction is carried out. In the current invention, a partial hydrolysate is one in which 60% of the protein/peptide population has a molecular weight of less than 1000 Daltons. Partial hydrolysates are considered as hypoallergenic (HA).

An essential amino acid or indispensable amino acid is an amino acid that cannot be synthesised de novo (from scratch) by the organism being considered, and therefore must be supplied in its diet. There are nine amino acids humans cannot synthesize including threonine and tryptophan. The requirements of infant formulae regulations also encompass the contents in amino acids, particularly threonine and tryptophan.

U.S. Pat. No. 687,158 is directed to a process for the separation of glycomacropeptide or caseinoglycomacropeptide ("cGMP") from lactic raw material.

cGMP is a phosphorylated and partially sialylated macropeptide which is formed by the action of a protease, for example rennet, on mammalian milk kappa-casein. cGMP represents about 20% by weight of the proteins in sweet whey obtained after separation of casein during cheese manufacture.

U.S. Pat. No. 6,787,158 relates to a process for the extraction of cGMP from a lactic raw material comprising the steps of removing cations from a lactic raw material for a sufficient amount of time to obtain a substantially deionised lactic raw material having a pH of about 1 to 4.5; contacting the substantially deionised lactic raw material with an anionic resin having a hydrophobic matrix for a sufficient amount of time and at a sufficient temperature to remove cGMP from the substantially deionised lactic raw material and to obtain a treated liquid material; separating the resin from the treated liquid material; and rinsing the resin to obtain the cGMP therefrom. When using a fluidized bed reactor, the cGMP is removed in a range from 85 to 91% of the starting cGMP.

The treated liquid material that is obtained from sweet whey has an amino acid profile reduced in threonine and enriched in aromatic amino acids such as tryptophan. It is useful in an infant or dietetic product as a protein source or raw material. From up to now, this treated liquid was used in standard infant formulae in which the proteins were intact. These infant formulae are such that the casein/whey ratio is about 30/70. This treated liquid was also used in hypoallergenic infant formulae, in admixture with other protein raw material, so that to fulfill the regulatory requirements.

However, there is a growing need of hypoallergenic formulae in which the proteins are partially hydrolyzed. These formulae are based on a protein raw material made of 100% whey. Thus, the existing process described in U.S. Pat. No. 6,787,158 fails to provide a protein material meeting the protein requirements of these hypoallergenic formulae.

It is therefore an object of the invention to provide a process for removing cGMP from a sweet whey material, in order to obtain a protein raw material suitable for hypoallergenic infant formulae, or to at least provide a useful alternative.

SUMMARY OF THE INVENTION

In an aspect of the invention, there is provided a process for the treatment of a sweet whey material containing cGMP (caseinoGlycoMacroPeptide), said process comprising the following steps:

Decationising the sweet whey material so as to obtain sweet whey having a pH value of 1 to 4.5;
treating said sweet whey in a fluidized bed reactor in the presence of a specific volume of an anionic resin, at a temperature between 10 and 18° C., wherein said sweet whey contacts said resin so that the resin absorbs between 52% and 58% of the cGMP present in the sweet whey; and
Recovering a protein material.

Surprisingly, it has been found that the absorption in the resin of a lower level of the cGMP present in the sweet whey, with respect to the level absorbed in the prior art, has not effect on the corresponding absorption of the anions in the resin, in particular chloride and phosphorous anions: the resin still absorbs at least 90% of the anions present in the sweet whey.

In a preferred embodiment of the invention, the protein material is suitable for hypoallergenic infant formulae.

BRIEF DESCRIPTION OF THE FIGURES

FIG. 1 is a schematic representation of a device for use in a process of the present invention.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention, and do not limit the scope of the invention when taken into consideration with the claims and the following detailed description.

In the present description, the following words are given a definition that should be taken into account when reading and interpreting the description, examples and claims.

As used herein, the following terms have the following meanings.

The term "removal of a compound" means that the compound present in a product is absorbed in the resin thereby producing a product having a lower content of the compound. The corresponding percentage is the percentage of the compound in the product which is removed from the product by absorption in the resin.

The term "suitable for infant formulae" means that the product can be directly used in infant formulae, without any adaptation. This means that there is no need for mixing the product with at least one different source of proteins and/or amino acids.

The term "hypoallergenic" means that 60% of the protein/peptide population has a molecular weight of less than 1000 Daltons.

The term "infant" means a child under the age of 12 months.

The term "preterm infant" (or "premature infant") means an infant born prior to 37 weeks gestational age.

The term "infant formula" means a foodstuff intended for particular nutritional use by infants during the first four to six months of life and satisfying by itself the nutritional requirements of this category of person (Article 1.2 of the European Commission Directive 91/321/EEC of May 14, 1991 on infant formulae and follow-on formulae).

The term "preterm infant formula" means an infant formula intended for a preterm infant.

As used in this specification, the words "comprises", "comprising", and similar words, are not to be interpreted in an exclusive or exhaustive sense. In other words, they are intended to mean "including, but not limited to".

Any reference to prior art documents in this specification is not to be considered an admission that such prior art is widely known or forms part of the common general knowledge in the field.

The process according to the invention is advantageously such that the protein material is suitable for hypoallergenic infant formulae. It means that undesired products such as anions and cGMP have been absorbed by the resin during the process so that they are present at acceptable levels (impurity traces) in the protein material. It means also the protein content of the sweet whey material has been modified such that amino acids such as Tryptophan and Threonine are present at acceptable levels in the protein material, since the resins has absorbed proteins and/or macropeptides (such as cGMP).

The decationising step does not change substantially the content of anions or cGMP in the sweet whey material. Thus, the absorption in the resin of the cGMP and anions can relate either to their content in the sweet whey material or to their content in the sweet whey material. We choose here to refer to their content in the sweet whey.

In a preferred embodiment of the invention, the resin absorbs around 55% of the cGMP present in the sweet whey.

In a preferred embodiment of the invention, the resin absorbs at least 90% of the anions present in the sweet whey.

The anions are generally selected from the group consisting of chlorine, phosphorous, citrate, sulphate and lactate.

In a preferred embodiment of the invention, the resin absorbs at least 90% of the chlorine and of the phosphorous present in the sweet whey.

In a preferred embodiment of the invention, the treatment of the sweet whey in the fluidized bed reactor is implemented at a ratio of protein over resin of 0.20 to 0.35 kg/L.

In a preferred embodiment of the invention, the treatment of the sweet whey in the fluidized bed reactor is implemented at a ratio of cGMP over resin between 39 and 41 g/L.

In this process, the sweet whey material can be one of sweet whey obtained after separation of casein coagulated with rennet, a concentrate of sweet whey, a sweet whey or such a whey demineralized to by electrodialysis, ion exchange, reverse osmosis, electrodeionisation or a combination of these procedures, a concentrate of sweet whey demineralized by electrodialysis, ion exchange, reverse osmosis, electrodeionisation or a combination of these procedures, a concentrate of proteins of substantially lactose-free sweet whey obtained by ultrafiltration, followed by diafiltration (ultrafiltration with washing), mother liquors of the crystallization of lactose from sweet whey, a permeate of ultrafiltration of a sweet whey, the product of hydrolysis, by a protease, of a native casein obtained by acid precipitation of skimmed milk with an inorganic acid or by biological acidification, obtained by microfiltration of a skimmed milk, or the product of hydrolysis of a caseinate by a protease. Preferably, the sweet whey has a solid content of about 10 to 30 percent by weight after its decationisation.

The sweet whey material is usually a liquid which can be obtained from dispersion and/or dissolution of solid whey powders in a liquid.

Advantageously, the resin is treated with an alkaline material prior to contact with the sweet whey. Preferably, the sweet whey contacts the resin in a gently stirred reactor at a temperature of less than 50° C. for one to ten hours to adsorb the suitable amount of cGMP onto the resin. A suitable resin is one that is basic and in macroporous or macrocross-linked gel form. The sweet whey usually contacts the resin until the treated liquid material attains a constant pH of between about 4.2 to about 5.8 to indicate that the reaction has proceeded to completion. Advantageously, the sweet whey and the resin are present in a volume ratio of 1:1 to 30:1, preferably 1:2 to 1:10.

The protein material obtained by the process according to the invention is a protein source intended for use by infants, including preterm infants or low birth weight infants, specifically in hypoallergenic infant formulae, including hypoallergenic preterm infant formulae. These formulas fulfil all the regulatory requirements for infants that is to say that they comprise, in addition to this protein source, additional components such as a source of available carbohydrates and a lipid source.

The chlorine content of the protein material is usually between 1 mg/100 g, preferably between 5 and 80 mg/100 g and/or the phosphorous content of the protein material is between 50 and 150 mg/100 g, preferably between 90 and 160 mg/100 g.

The tryptophan over threonine ratio of the protein material is generally between 0.350 and 0.360, more preferably around 0.355.

The protein material is advantagously suitable for hypoallergenic infant formulae.

FIG. 1 illustrates a device for use in the process of the present invention. A reactor 1 has in its upper section a principal tank 2 connected to a lower part having a compartment 3 through a smaller diameter than that of the tank 2. Tank 2 has a rinsing liquid inlet channel 4, an inlet 5 to allow entry of pressurized gas, a safety valve 6 to regulate the gas pressure in reactor 1. Close to the base of tank 2 there is a strainer 7 and a channel 8 for drawing off liquid.

Connected to compartment 3, the reactor has a pH-meter 9, a gas inlet 10 and a three-way valve 11 connected to an inlet channel 12 for liquid to be treated and a discharge channel 13 to remove treated liquid. The base of compartment 3 has a grid or a perforated plate 14 which collects resin beads 15. Under grid 14, a drawing-off channel 16 removes the liquid via pump 17 to a buffer tank 18, which has a level controlling device 19. Channel 20 via pump 21 removes liquid from buffer tank 18. Channel 20 is connected either to the channel 12, or to the discharge overflow 22.

The process using the device is now described, which was implemented in the following examples.

The initial sweet whey material (dispersion of powder whey in water), was formerly decationised by the means of cationic resin columns in the successive order: weak/strong/strong. The resulting sweet whey was introduced via channel 12 into reactor 1. Air was introduced by bubbling into compartment 3 through the base by the inlet 10 via a non-return valve 23. A fluidized bed of resin beads 15 was created comprising weakly anionic resin of hydrophobic matrix based on polystyrene (IMAC HP 661, Rohm & Haas, regenerated in OH⁻ form). The resin beads 15 were stirred for 4 h in contact with the dispersion due to the turbulence created by the fluidization. The pH of the liquid was constantly controlled by means of the pH-meter 9. Constant analysis of the sweet whey by high-performance liquid chromatography ("HPLC") (not shown) showed when the reaction removed 55% of the cGMP present in the sweet whey. At this point, the desired content of cGMP being removed, the air supply at inlet 10 was cut off and air was introduced through inlet 5 at the top of the reactor above the liquid level 24. The liquid was pressurized and the resin beads settled in the lower part of compartment 3 of reactor 2 where they were retained by grid 14. The treated liquid material was drawn off by gravity and/or pumping through channel 8 and through channel 16 by means of pump 17 towards buffer tank 18. The treated liquid material was then discharged by channel 20 by means of pump 21 and directed towards the outlet by channels 12 and 13.

The treated liquid material was standardized and pH adjusted, concentrated by evaporation or nano filtration and the concentrate was spray-dried in a drying tower.

The recovery of cGMP is optional. It is nevertheless illustrated in FIG. 1. To recover the cGMP, the reactor and the resin were washed with deionised water introduced through inlet channel 25, via valve 26, and inlet channel 4 and flushed through the reactor via channels 12 and 13. The cGMP was eluted twice through the same circuit with aqueous 2% NaOH introduced via channel 27 and valve 28 and rinsed with 30 l of deionised water. After combining the eluate and washing volumes, the volume was concentrated by ultrafiltration or nanofiltration with a membrane having a nominal cut-off of 3000 daltons to obtain a retentate and a filtrate. The retentate was freeze-dried.

Periodically, the resin could be subjected to acidic regeneration after alkaline regeneration once the equivalent of 10 volumes of resin bed had been treated. After elution of the cGMP with the alkaline solution as described above, the resin was washed with a concentrated aqueous solution of HCl supplied by channel 29 and valve 30, followed by water supplied by channel 25 and valve 26. The resin was converted to the OH⁻ form by passing a concentrated aqueous solution of NaOH supplied by channel 27 followed by water from channel 25, into channel 4. The solutions were removed from reactor 1 via channel 16, transferred by pump 17 to the buffer tank 18. From buffer tank 18, the solutions were removed by pump 21, discharged by channel 20 and overflow 22 into the effluent treatment. Following this operation, the resin was ready for another treatment cycle.

The treated liquid was removed and used as a protein material according to the invention.

The invention is further described with reference to the following examples. It will be appreciated that the invention as claimed is not intended to be limited in any way by these examples.

EXAMPLES

Example 1: Process Adapted from U.S. Pat. No. 6,787,158 Removing at Least 90% of the cGMP from the Sweet Whey Material The sweet whey material was whey concentrate WPC 31.5. It was decationised with weak/strong/strong cation exchange resins. The weak resin was IMAC HP 336 and the strong resin was IMAX 1110Na, both sold by Dow Chemical (formerly Rohm & Haas). The resulting sweet whey had a protein content of around 31.5% on DM (for Dry Matter) with a total solid content of 18% and a pH of 1.85. 3700 kg of this sweet whey were pumped into the reactor 1 containing 7500 liters of weak anion exchange resin (HP 661 food grade). The entire sweet whey volume was contacted with the resin. The resin and the sweet whey were suspended together for 4 hours at a temperature of 15 to 18° C. The pH was increasing from 1.85 to a final pH of 5.1 to 5.3 over the 4 hours of reaction time. The cGMP removal was monitored by HPLC.

After 4 hours of reaction time, the resulting demineralized and cGMP depleted whey was pumped out of the reactor. This protein material whey was pushed out and the resin was washed with water in order to reduce losses on proteins and dry matter. The cGMP was recovered by a combined step of elution and regeneration with 4% NaOH. After the regeneration the NaOH was pushed out with water and rinsed with water until the pH reached around 10.5. Once this pH was reached the reactor was ready for the next production. After standard neutralization with NaOH and KOH, the product was heat treated, evaporated and spray dried.

The data relevant to the process is summarized in Table 1 below.

| | |
|---|---|
| Dry matter (DM) load (kg) | 3700 |
| Resin HP 661 amount (L) | 7500 |
| DM per liter of resin (kg/L) | 0.60 |
| Protein per liter of resin (kg/L) | 0.19 |
| cGMP bound per liter resin (g/L) | 39 |
| NaOH (100%) per kg DM (g/L) | 85 |
| Reaction time (h) | 4 |
| Cycle time (h) | 12 |
| Trp/Thr ratio | 0.42 |

Example 2 (According to the Invention): Process According to the Invention Removing 55% of the cGMP from the Sweet Whey Material The sweet whey material was whey concentrate WPC 80. It was decationised with weak/strong/strong cation exchange resins. The weak resin was IMAC HP 336 and the strong resin was IMAX 1110Na, both sold by Dow Chemical (formerly Rohm & Haas). The resulting sweet whey had a protein content of around 82% on DM (for Dry Matter) with a total solid content of 12% and a pH of 3.40. 4235 kg of this sweet whey were pumped into the reactor containing 11,600 liters of weak anion exchange resin (HP 661 food grade). The entire sweet whey volume was contacted with the resin. The resin and the sweet whey were suspended together for 4 hours at a temperature of 15 to 18° C. The pH was increasing from 3.40 to a final pH of 4.80 over the 4 hours of reaction time. The cGMP removal was monitored by HPLC.

After 4 hours of reaction time, the resulting demineralized and cGMP sweet whey was reduced by 55% and this protein material was pumped out of the reactor. This protein material was pushed out and the resin was washed with water in order to reduce losses on proteins and dry matter. The cGMP was recovered by a combined step of elution and regeneration with 4% NaOH. After the regeneration, the NaOH was pushed out with water and rinsed with water until the pH reached around 10.5. Once this pH was reached the reactor was ready for the next production. After standard neutralization with NaOH and KOH, the product was heat treated, evaporated and spray dried.

The data relevant to the process is summarized in Table 2 below.

| | |
|---|---|
| Dry matter (DM) load (kg) | 4235 kg |
| Resin amount (L) | 11600 |
| DM per liter of resin (kg/L) | 0.37 |
| Protein per liter of resin (kg/L) | 0.30 |
| cGMP bound per liter resin (g/L) | 39 |
| NaOH (100%) per kg DM (g/L) | 123 |
| Reaction time (h) | 4 |
| Cycle time (h) | 12 |
| Trp/Thr ratio | 0.36 |

The tryptophan/threonine (Trp/Thr) ratio was identical to said ratio in the on-sale hypoallergenic infant formula NAN 1 HA from Nestlè.

The capacity (i.e. dry matter load) of the reactor, with respect to the parameter protein per liter of resin, was increased by 35%. The efficiency of the regeneration (g NaOH/kg of DM) was improved from 51 g NaOH/L resin (=85×0.6, numerals in Table 1) down to 36.9 g NaOH/L resin (=39×0.37, numerals in Table 2). Therefore also less waste water was generated per kg DM.

Furthermore, the content of chloride in the protein material issued from the process applying a 90% cGMP removal was 11 mg/100 g of chloride and 100 mg/100 g of phosphorous, which helps to make this protein material suitable for hypoallergenic infant formulae.

Surprisingly, although only 55% of the cGMP were removed, the mineral anions such as chloride (Cl), phosphorous (P), and citrate, were still 90% removed from the sweet whey.

Actually, the content of chloride and phosphorous anions in the sweet whey material were 180 mg/100 g of chloride and 370 mg/100 g of phosphorous. The contents of chloride and phosphorous anions in the protein material issued from the comparative process applying a 90% cGMP removal were 11 mg/100 g of chloride and 100 mg/100 g of phosphorous.

On this basis, one would expect that around 55% of cGMP removal should lead to the following calculated (theoretical) values: 100 mg/100 g of chlorine and 200 mg/100 g of phosphorous. Actually, the content of chloride in the protein material issued from the process applying a 55% cGMP removal was 9 mg/100 g of chloride and 104 mg/100 g of phosphorous.

Thus the protein material obtained by the process according to the invention, with 55% cGMP removal, showed surprisingly the same mineral profile as a 90% removal process which helps to make the protein material suitable for hypoallergenic infant formulae.

Example 3 (According to the Invention): Process According to the Invention Removing 55% of the cGMP from the Sweet Whey Material The sweet whey material was whey concentrate WPC 31.5. It was decationised with weak/strong/strong cation exchange resins. The weak resin was IMAC HP 336 and the strong resin was IMAX 1110Na, both sold by Dow Chemical (formerly Rohm & Haas). The resulting sweet whey had a protein content of around 31.5% on DM (for Dry Matter) with a total solid content of 18% and a pH of 1.75. 6785 kg of this sweet whey were pumped into the reactor containing 8,500 liters of weak anion exchange resin (HP 661 food grade). The entire sweet whey volume was contacted with the resin. The resin and the sweet whey were suspended together for 4 hours at a temperature of 15 to 18° C. The pH was increasing from 1.75 to a final pH of 4.90 over the 4 hours of reaction time. The cGMP removal was monitored by HPLC.

After 4 hours of reaction time, the resulting demineralized and cGMP sweet whey was reduced by 55% and this protein material was pumped out of the reactor. This protein material was pushed out and the resin was washed with water in order to reduce losses on proteins and dry matter. The cGMP was recovered by a combined step of elution and regeneration with 4% NaOH. After the regeneration the NaOH was pushed out with water and rinsed with water until the pH reached around 10.5. Once this pH was reached the reactor was ready for the next production. After standard neutralization with NaOH and KOH, the product was heat treated, evaporated and spray dried.

The data relevant to the process is summarized in Table 3 below.

| | |
|---|---|
| Dry matter (DM) load (kg) | 6785 kg |
| Resin amount (L) | 8500 |
| DM per liter of resin (kg/L) | 0.80 |
| Protein per liter of resin (kg/L) | 0.25 |
| cGMP bound per liter resin (g/L) | 39 |

-continued

| | |
|---|---|
| NaOH (100%) per kg DM (g/L) | 55 |
| Reaction time (h) | 4 |
| Cycle time (h) | 12 |
| Trp/Thr ratio | 0.36 |

The tryptophan/threonine (Trp/Thr) ratio was identical to said ratio in the on-sale hypoallergenic infant formula NAN 1 HA from Nestlè.

The capacity of the reactor, with respect to the parameter protein per liter of resin, was increased by 15%. The efficiency of the regeneration (g NaOH/kg of DM) was improved from 51 g NaOH/L resin (=85×0.6, numerals in Table 1) down to 44 g NaOH/L resin (=55×0.8, numerals in Table 3). Therefore, also less waste water is generated per kg DM.

Actually, the content of chloride in the protein material issued from the process applying a 55% cGMP removal was 14 mg/100 g of chloride and 135 mg/100 g of phosphorous.

Thus, the protein material obtained by the process according to the invention, with 55% cGMP removal, shows surprisingly the same mineral profile as a 90% removal process which made this protein material suitable for hypoallergenic infant formulae.

Although the invention has been described by way of examples, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A process for treatment of a sweet whey material containing cGMP (caseinoGlycoMacroPeptide), the process comprising:
   decationising the sweet whey material to obtain sweet whey having a pH value of 1 to 4.5;
   treating the sweet whey in a fluidized bed reactor comprising a specific volume of an anionic resin at a temperature between 10 and 18° C. and at a ratio of protein over resin of 0.20 to 0.35 kg/L, wherein the sweet whey contacts the anionic resin for a sufficient amount of time, so that the anionic resin absorbs between 52% and 58% of the cGMP present in the sweet whey and at least 90% of anions present in the sweet whey; and
   recovering a protein material suitable for hypoallergenic infant formulae, the protein material comprising a tryptophan:threonine ratio between 0.350 and 0.360.

2. The process according to claim 1, wherein the anionic resin absorbs around 55% of the cGMP.

3. The process according to claim 1, wherein the anionic resin absorbs at least 90% of anions present in the sweet whey.

4. The process according to claim 3, wherein the anions are selected from the group consisting of chlorine, phosphorous, citrate, sulphate, lactate, and combinations thereof.

5. The process according to claim 1, wherein the anionic resin absorbs at least 90% of chlorine and of phosphorous anions present in the sweet whey.

6. The process according to claim 1 comprising treating the sweet whey in the fluidized bed reactor at a ratio of cGMP over resin between 39 and 41 g/L.

7. The process according to claim 1, wherein the sweet whey material is selected from the group consisting of sweet whey obtained after separation of casein coagulated with rennet, a concentrate of sweet whey, a sweet whey demineralized by electrodialysis, ion exchange, reverse osmosis, electrodeionisation or a combination thereof, a concentrate of sweet whey demineralized by electrodialysis, ion exchange, reverse osmosis, electrodeionisation or a combination thereof, a concentrate of proteins of substantially lactose-free sweet whey obtained by ultrafiltration followed by diafiltration, mother liquors of the crystallization of lactose from sweet whey, a permeate of ultrafiltration of a sweet whey, a product of hydrolysis by a protease of a native casein obtained by acid precipitation of skimmed milk with an inorganic acid or by biological acidification obtained by microfiltration of a skimmed milk, a product of hydrolysis of a caseinate by a protease, and combinations thereof.

8. The process according to claim 1, wherein the sweet whey has a solid content of about 10 to 30 percent by weight after decationisation.

* * * * *